(12) United States Patent  
Campbell et al.

(10) Patent No.: US 10,181,036 B2  
(45) Date of Patent: Jan. 15, 2019

(54) AUTOMATIC DISCOVERY AND INSTALLATION OF SECURE BOOT CERTIFICATES

(71) Applicant: Lenovo Enterprise Solutions (Singapore) Pte. Ltd., Singapore (SG)

(72) Inventors: Nathan K. Campbell, Edmonds, WA (US); Douglas W. Oliver, Hemphill, TX (US); ShengRui Ji, ShangHai (CN); SongWu Shen, Shanghai (CN); WenWei Tang, ShangHai (CN)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 0 days.

(21) Appl. No.: 14/749,042

(22) Filed: Jun. 24, 2015

(65) Prior Publication Data

US 2016/0378970 A1 Dec. 29, 2016

(51) Int. Cl.
| | |
|---|---|
| *G06F 7/04* | (2006.01) |
| *G06F 12/14* | (2006.01) |
| *G06F 13/00* | (2006.01) |
| *G06F 17/30* | (2006.01) |
| *G11C 7/00* | (2006.01) |
| *G06F 21/57* | (2013.01) |

(52) U.S. Cl.  
CPC .................. *G06F 21/575* (2013.01)

(58) Field of Classification Search  
CPC .............................. G06F 21/44; G06F 21/575  
USPC ......................................................... 726/17  
See application file for complete search history.

(56) References Cited

U.S. PATENT DOCUMENTS

| 7,653,810 B2 | 1/2010 | Thornton et al. | |
| 2001/0013024 A1* | 8/2001 | Takahashi | G06F 21/10 705/59 |
| 2004/0187031 A1* | 9/2004 | Liddle | H04L 63/20 726/1 |
| 2005/0074124 A1 | 4/2005 | Thornton et al. | |
| 2005/0278534 A1* | 12/2005 | Nadalin | H04L 9/3263 713/175 |
| 2006/0015729 A1* | 1/2006 | Novack | H04L 63/0823 713/173 |
| 2009/0031409 A1* | 1/2009 | Murray | H04N 21/462 726/10 |

(Continued)

OTHER PUBLICATIONS

Steven Czerwinski, An Architecture for a secure service discovery service; ACM 1999; p. 1-12.*

(Continued)

*Primary Examiner* — Monjur Rahim  
(74) *Attorney, Agent, or Firm* — Jeffrey L. Streets

(57) ABSTRACT

A method includes a unified extensible firmware interface of a compute node identifying an option ROM or an OS boot loader within the compute node, wherein the option ROM or OS boot loader stores a signed image that can be verified using a required digital certificate. The method further includes determining that the unified extensible firmware interface does not store the required digital certificate in a revocation database or in an authorization database. Still further, the method includes automatically identifying the required digital certificate in a database of digital certificates other than the revocation database or the authorization database, and providing the required digital certificate to the authorization database.

20 Claims, 4 Drawing Sheets

(56) References Cited

U.S. PATENT DOCUMENTS

| | | | | |
|---|---|---|---|---|
| 2009/0319783 | A1* | 12/2009 | Thornton | H04L 63/0823 713/156 |
| 2009/0327741 | A1* | 12/2009 | Zimmer | G06F 21/575 713/183 |
| 2010/0169633 | A1* | 7/2010 | Zimmer | G06F 21/575 713/2 |
| 2013/0104188 | A1* | 4/2013 | Western | G06F 21/57 726/1 |
| 2013/0124843 | A1* | 5/2013 | Bobzin | G06F 21/575 713/2 |
| 2014/0137261 | A1* | 5/2014 | Chen | G06F 21/105 726/26 |
| 2014/0149730 | A1* | 5/2014 | Joshi | G06F 21/572 713/2 |
| 2015/0074387 | A1* | 3/2015 | Lewis | G06F 21/575 713/2 |
| 2015/0193620 | A1* | 7/2015 | Khatri | G06F 21/575 713/2 |
| 2015/0281237 | A1* | 10/2015 | Swanson | H04L 63/10 726/3 |
| 2016/0043869 | A1* | 2/2016 | Smith | H04L 9/3247 713/176 |
| 2016/0173487 | A1* | 6/2016 | Griffith | H04L 63/0823 713/156 |

OTHER PUBLICATIONS

Steven Czerwinski, An Architecture for a secure service discovery servicel ACM 1999; p. 1-12.*

* cited by examiner

AUTOMATIC DISCOVERY AND INSTALLATION OF SECURE BOOT CERTIFICATES

BACKGROUND

Field of the Invention

The present invention relates to the use of a UEFI Secure Boot procedure to facilitate the use of authorized software and devices, such as Option ROMs and operating system boot loaders.

Background of the Related Art

Secure Boot prevents "unauthorized" operating systems and software from loading during the startup process. When Secure Boot is enabled, Secure Boot checks each piece of software, including the UEFI drivers (Option ROMs) and the operating system, against a database of known-good signatures. If each piece of software can be verified, the firmware runs the software and the operating system. The UEFI firmware includes the signature database (DB), revoked signatures database (DBX), and the Key Enrollment Key database (KEK). These databases are stored on the UEFI flash at the time of manufacturing.

The signature database (DB) and the revoked signatures database (DBX) list the signatures or image hashes of UEFI applications, operating system loaders (such as the Microsoft Operating System Loader, or Boot Manager), and UEFI drivers that can be loaded on the server, and the revoked images for items that are no longer trusted and may not be loaded. The Key Enrollment Key database (KEK) is a separate database of signing keys that can be used to update the signature database and revoked signatures database. The developer of the operating system requires a specified key to be included in the KEK database so that the developer can add new operating systems to the signature database or add known bad images to the revoked signatures database. After these databases have been added, and after final firmware verification and testing, the firmware is locked from editing, except for updates that are signed with the correct key or updates by a physically present user who is using the firmware menu, and then generates a platform key (PK).

The UEFI allows Secure Boot to be selectively "enabled" or "disabled". If Secure Boot is disabled, then any image may be run without verifying or authorizing the image. If Secure Boot is enabled, a set of default digital certificates and/or signatures are used to boot any OS or use any Option ROMs. The default digital certificates and/or signatures may be provided by the original equipment manufacturer of the node. If an image cannot be verified, then the OS or driver will not be loaded.

BRIEF SUMMARY

One embodiment of the present invention provides a method comprising a unified extensible firmware interface of a compute node identifying an option ROM or an OS boot loader within the compute node, wherein the option ROM or OS boot loader stores a signed image that can be verified using a required digital certificate. The method further comprises determining that the unified extensible firmware interface does not store the required digital certificate in a revocation database or in an authorization database. Still further, the method comprises automatically identifying the required digital certificate in a database of digital certificates other than the revocation database or the authorization database, and providing the required digital certificate to the authorization database (DB).

Another embodiment of the present invention provides a computer program product comprising a non-transitory computer readable storage medium having program instructions embodied therewith, wherein the program instructions are executable by a processor to cause the processor to perform a method. The method comprises a unified extensible firmware interface of a compute node identifying an option ROM or an OS boot loader within the compute node, wherein the option ROM or OS boot loader stores a signed image that can be verified using a required digital certificate. The method further comprises determining that the unified extensible firmware interface does not store the required digital certificate in a revocation database or in an authorization database. Still further, the method comprises automatically identifying the required digital certificate in a database of digital certificates other than the revocation database or the authorization database, and providing the required digital certificate to the authorization database (DB).

DETAILED DESCRIPTION

Figure 1:
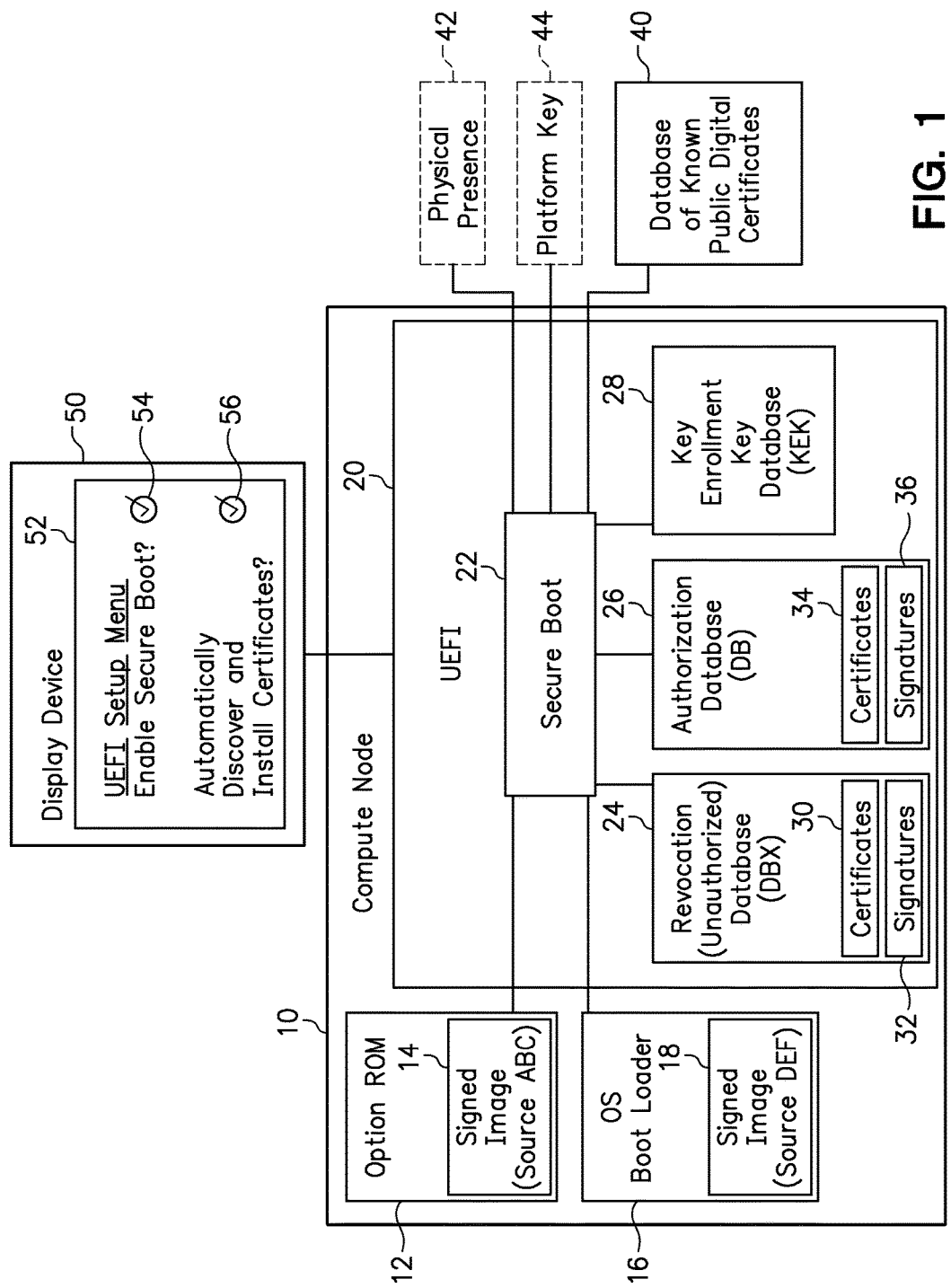
FIG. 1 is a block diagram of a unified extensible firmware interface (UEFI) in communication with a database of known public digital certificates in accordance with various embodiments of the present invention.

One embodiment of the present invention provides a method comprising a unified extensible firmware interface of a compute node identifying an option ROM or an OS boot loader within the compute node, wherein the option ROM or OS boot loader stores a signed image that can be verified using a required digital certificate. The method further comprises determining that the unified extensible firmware interface does not store the required digital certificate in a revocation database or in an authorization database. Still further, the method comprises automatically identifying the required digital certificate in a database of digital certificates other than the revocation database or the authorization database, and providing the required digital certificate to the authorization database (DB).

A UEFI setup menu may allow a user to select whether or not to enable Secure Boot. If secure boot is disabled, all Option ROMs and operating system (OS) boot loaders are allowed to load. If Secure Boot is enabled, Secure Boot automatically discovers each Option ROM and OS boot loader within the system during a startup process and prevents loading of any Option ROM or OS boot loader that is not signed. The UEFI identifies an option ROM or OS boot loader by probing the buses and identifying any card at BusX, DeviceY, FunctionZ. All cards have the ability to have an Option ROM loaded on them. If an installed card has an Option ROM available, then the UEFI reads the Option ROM over the bus. If an installed card does not have an Option ROM available, then it is possible that the firmware may store code for the card. The UEFI may also "discover" an OS boot loader in a similar manner. Once the OS boot loader is discovered, the UEFI may identify the operating system without executing the operating system. By reading an Option ROM or an OS boot loader, the UEFI can determine whether the OS boot loader is signed and obtain a copy of the signature.

If Secure Boot is enabled and the image is signed, then Secure Boot determines whether the image is covered by a digital certificate in the DBX. If the necessary digital certification is in DBX, then Secure Boot will not allow the image to load. A digital certificate may be placed in the "revocation database" (DBX) in response to various situations, such as when a source of an image has been compromised. For example, if a signing server has been hacked, then the images signed by that signing server should not be used. Accordingly, the digital certificate issued by that signing server should be added to the revocation database (DBX) to prevent any images from being verified with the digital certificate.

If the necessary digital certificate is not in the revocation database (DBX), then Secure Boot determines whether the digital certificate is in the authorization database (DB). If the certificate is then found to be in the authorization database (DB), then the certificate will allow many images to be used with the certificate only. If the certificate is then not found in the authorization database (DB), then the image will not be allowed to load. Unfortunately, if the necessary certificate is not found in either the revocation database (DBX) or the authorization database (DB), the Option ROM or OS boot loader is not allowed to be loaded. While Secure Boot prevents malicious or inappropriate images from being loaded, Secure Boot may also prevent use of an installed device and loading of a signed image merely because the UEFI is "missing" the necessary digital certificate.

In accordance with embodiments of the present invention, the UEFI setup menu may also allow a user to select whether or not to enable automatic discovery and installation of digital certificates required to authorize use of signed option ROMs and OS boot loaders. With the automatic discovery and installation feature enabled, it is not necessary for the user to have any knowledge of the Secure Boot signing process or knowledge of which digital certificates are required to support the Option ROMs and OS boot loaders in the system. Furthermore, the automatic discovery and installation of digital certificates may save the user time determining why a device or operating system won't load, or attempting to locate the required certificate. The automatic discovery and installation of digital certificates may be used to discover and install certificates into either or both of the authorization database (DB) and the revocation database (DBX).

The UEFI authorization database (DB) preferably stores only a small default list of digital certificates in order to limit the possibility of accidentally authorizing an Option ROM or OS boot loader that shouldn't be authorized. Accordingly, if Secure Boot determines that a required certificate is missing from both the revocation database (DBX) and the authorization database (DB), then the UEFI initiates a search for the missing certificate in a known database of public UEFI certificates. If the Option ROM or OS boot loader image has a header with information about the required certificate, then that header information may be used in the search for the certificate. For example, the header may identify the manufacturer of the device or include a code uniquely identifying a certificate. However, if there is no useful header information, the search may involve testing each of the certificates in the known database of public UEFI certificates until an identified one of the certificates is able to decode the digital signature in the signed image such that the decoded digital signature matches a hash of the image. The digital certificate identified in this manner is the required digital certificate that may be provided to the authorization database (DB).

In one option, the method may determine that the unified extensible firmware interface does not store the required digital certificate in a revocation database or in an authorization database by sequentially testing each digital certificate in the revocation database and the authorization database until all of the digital certificates in the revocation database and the authorization database have been tested without identifying the required digital certificate. The testing may include, for each digital certificate, decoding a digital signature in the signed image with a public key included in the digital certificate, preparing a hash of the image, and comparing the decoded digital signature to the hash of the image. A digital certificate may then be identified as not being the required digital certificate in response to determining that the decoded digital signature does not match the hash of the image.

In another option, the method may automatically identify the required digital certificate in a database of digital certificates other than the revocation database or the authorization database by sequentially testing each digital certificate in the database of digital certificates until identifying the required digital certificate. The testing may include, for each digital certificate, decoding a digital signature in the signed image with a public key included in the digital certificate, preparing a hash of the image, and comparing the decoded digital signature to the hash of the image. A digital certificate may then be identified as the required digital certificate in response to determining that the decoded digital signature matches the hash of the image.

In yet another option, the method may automatically identify the required digital certificate in a database of digital certificates other than the revocation database or the authorization database by reading header information in the signed image to obtain an identifier for the required digital certificate. The database of digital certificates may then be searched for a digital certificate having the identifier.

Another embodiment of the method may further comprise verifying the signed image stored on the option ROM or OS boot loader using the required digital certificate, and loading the signed image only if the signed image has been verified. Optionally, the step of verifying the signed image stored on the option ROM or OS boot loader using the digital certificate, may include decoding a digital signature of the signed image using a public key included in the required digital certificate and determining that the decoded digital signature matches a hash of the signed image.

The known database of public UEFI certificates may include some or all known certificates, whereas the UEFI typically includes only a small subset of default certificates that are expected to be used by UEFI. The known database of public UEFI certificates may also be periodically updated. The database may be stored in any of a number of locations accessible to the UEFI of a node. Non-limiting examples of locations for storing the database of digital certificates includes a secure locked area of the UEFI flash of the compute node, an integrated management module (IMM) that manages one or more nodes, a chassis management module (CMM) that manages multiple IMMs in a particular rack, or a server other than the compute node within a data center that houses the node. A current copy of the database of certificates might be downloaded from a third party, such as systems developer, and store a copy securely in a local data center.

Once a missing digital certificate has been located, the UEFI may automatically install the missing certificate in the authorization database (DB). Optionally, the user is prompted to accept or reject the use of the missing certificate, such that the certificate is only installed into the authorization database (DB) if the user accepts use of the missing certificate. Then, after the missing certificate has been provided in the authorization database (DB), Secure Boot may allow the corresponding signed Option ROM or OS boot loader to be loaded.

In a further option, when the automatic discovery and installation option is enabled, digital certificates that are no longer needed to validate an Option ROM or OS boot loader may be automatically removed from the revocation database (DBX) or authorization database (DB) on a first-in-first-out basis to preserve data storage space in these UEFI databases. This automatic removal option would preferably only be enabled if accompanied by an assertion of Physical Presence. In one example, the method may further comprise automatically removing a selected digital certificate from the authorization database (DB) of the compute node in response to determining that the selected digital certificate is not used to verify an option ROM or OS boot loader in the computer node. In another example, the method may further comprise identifying a plurality of selected digital certificates in the authorization database (DB) of the compute node that are not being used to verify an option ROM or OS boot loader in the computer node, and automatically removing at least one of the identified plurality of selected digital certificates from the authorization database (DB) on a first-in-first-out basis to provide enough data storage space in the authorization database (DB) for the required digital certificate.

In one embodiment, the digital certificates may be X509 certificates that bind a public key to a source, such as an original equipment manufacturer (OEM). The digital certificates may also be X509 certificates issued by a certification authority. A certification authority (CA) is a trusted third party that issues a digital certificate that includes a public key and the verified identity of the owner of that public key.

Embodiments of the present invention may further include the use of the platform key (PK) and Key Enrollment Key (KEK) database. The platform key (PK) is required to validate a key enrollment key (KEK), and a key enrollment key (KEK) is required to validate either the authorization database (DB) or the revocation database (DBX).

Another embodiment of the present invention provides a computer program product comprising a non-transitory computer readable storage medium having program instructions embodied therewith, wherein the program instructions are executable by a processor to cause the processor to perform a method. The method comprises a unified extensible firmware interface of a compute node identifying an option ROM or an OS boot loader within the compute node, wherein the option ROM or OS boot loader stores a signed image that can be verified using a required digital certificate. The method further comprises determining that the unified extensible firmware interface does not store the required digital certificate in a revocation database or in an authorization database. Still further, the method comprises automatically identifying the required digital certificate in a database of digital certificates other than the revocation database or the authorization database, and providing the required digital certificate to the authorization database (DB).

The foregoing computer program products may further include program instructions for implementing or initiating any one or more aspects of the methods described herein. Accordingly, a separate description of the methods will not be duplicated in the context of a computer program product.

FIG. 1 is a block diagram of a compute node 10 including a unified extensible firmware interface (UEFI) 20 in communication with a database of known public digital certificates 40 in accordance with various embodiments of the present invention. The UEFI 20 includes a Secure Boot 22, which may be a software module executed by the UEFI. The UEFI 20 further includes a revocation database (DBX) 24, an authorization database (DB) 26, and a key enrollment key database (KEK) 28. The revocation database (DBX) 24 stores digital certificates 30 and digital signatures 32 for images that are not authorized to be loaded. The authorization database (DB) 26 stores digital certificates 34 and digital signatures 36 for images that are authorized to be loaded.

A display device 50 includes a screen for displaying a UEFI Setup Menu 52, which allows a user to select various settings. As shown, the menu 52 includes a first button 54 for enabling Secure Boot and a second button 56 for enabling a process to Automatically Discover and Install Certificates. Both buttons 52, 54 have been selected (see checkmark) so that the UEFI will perform one or more embodiments of the present invention.

Accordingly, Secure Boot 22 may identify one or more Option ROM 12 including a signed image 14 and one or more OS boot loader 16 including a signed image 18. The Secure Boot 22 may include logic to determine whether or not the signed images 14, 18, of the Option ROM 12 or OS boot loader 16 are authorized to be loaded and run. Specifically, Secure Boot 22 may determine, for each of the signed images 14, 18, whether there is a certificate 30, either in the revocation database (DBX) 24 or a certificate 34 in the authorization database (DB) 26, that is associated with the signed image. A certificate is associated with the signed image if it contains a public key that decodes a digital signature from the signed image such that the decoded digital signature matches a hash of the image. If such an associated certificate is in the revocation database (DBX) 24, then Secure Boot prevents the image from being loaded. Furthermore, Secure Boot 22 may determine, for each of the signed images 14, 18, whether there is a signature 32, either in the revocation database (DBX) 24 or in the authorization database (DB) 26, that is associated with the signed image. A signature is associated with the signed image if the signature matches a hash of the image. The use of certificates and signatures to determine whether to load and run an image or to prevent loading and deny an image is described further in reference to FIG. 3, below.

The UEFI 20 also allows for a user to assert "physical presence" 42 as is required for authenticating various changes to the system. A non-limiting example of physical presence 42 is a button or switch that is physically located on the compute node 10 such that pressing the button at an appropriate time indicates to the UEFI that the an authorized user is present in the datacenter and intends to authorize a proposed change to the system. For example, an assertion of physical presence might be required before turning off Secure Boot or before adding or removing a certificate to or from either the revocation database or the authorization database. In addition, the UEFI 20 further allows for a user to assert a platform key (PK) 44 which is used to sign updates to the key enrollment key (KEK) database or to turn off Secure Boot.

Figure 2:
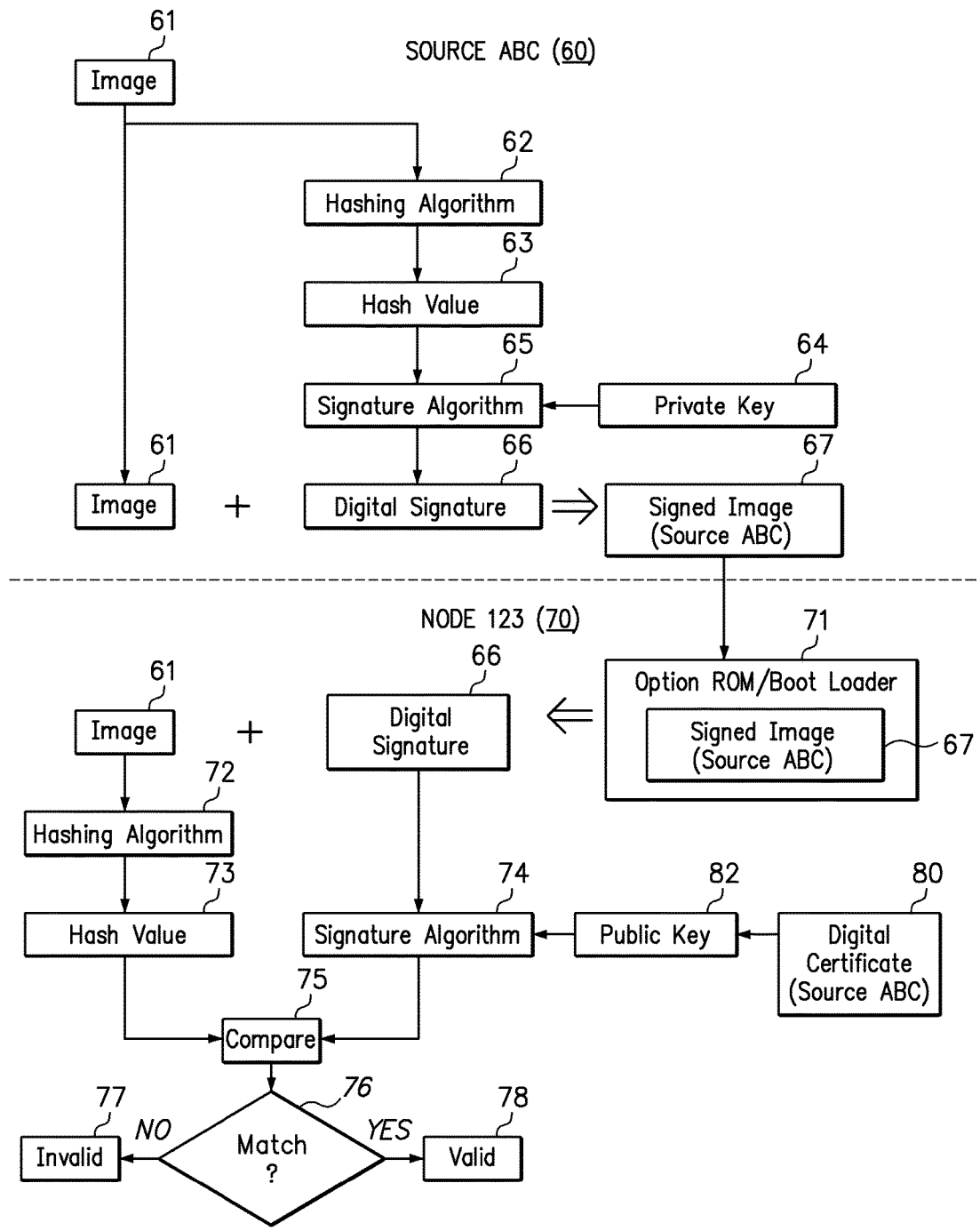
FIG. 2 is a flowchart showing the process of a source preparing a signed image and the process of a compute node verifying the signed image.

FIG. 2 is a flowchart showing the process of a source (Source ABC) 60 preparing a signed image and the process of a compute node (Node 123) 70 verifying the signed image. The source 60 obtains a digital image 61, such as software code that will be used by an Option ROM or OS boot loader. The digital image 61 is input to a hashing algorithm or function 62 to generate a hash value 63. Then, the hash value 63 and a private key 64 (from a public/private key pair for the source 60) are input to a signature algorithm 65 to generate a digital signature 66. The image 61 and the digital signature 66 are combined into a file referred to as a signed image 67. The source 60 provides the signed image 67 in an Option ROM or OS boot loader 71 (see also Option ROM 12 and OS boot loader 16 in FIG. 1), which is installed in the compute node 70.

As used herein, the term "hash" or "hash function" refers to a mathematical function that converts digital data of variable size to digital data of a fixed size, and makes it impractical to recreate the input data (i.e., the message or image) using only the output data (i.e., the hash) from the hash function, impractical to alter the input data without causing a change in the output data, and impractical for two sets of input data to result in the same output data.

In the compute node 70, Secure Boot can read both the image 61 and the digital signature 66 from the signed image 67. The image 61 is input to a hashing algorithm or function 72, which is the same function as hashing algorithm 62, to generate the hash value 73. A digital certificate 80 includes a public key 82. If the digital certificate 80 is obtained from the source 60 that signed the image 61, then the public key 82 is part of the public/private key pair that includes the private key 64 and will be able to decode the digital signature 66 to generate the same hash value 63 that was encoded by the private key 64. Therefore, the digital signature 66 and the public key 82 are input to the signature algorithm 74, and then (at step 75) the output of the signature algorithm 74 is compared to the hash value 73. If the output of the signature algorithm 74 is determined (at step 76) to not match the hash value 73, then the image 61 is identified as being invalid and will be prevented from being loaded. An invalid image may have an image that was been compromised by malicious code embedded since the original image 61 was signed by the source 60. However, if the output of the signature algorithm 74 is determined (at step 76) to match the hash value 73, then the image 61 is the original image that was signed by the source 60.

Figure 3:
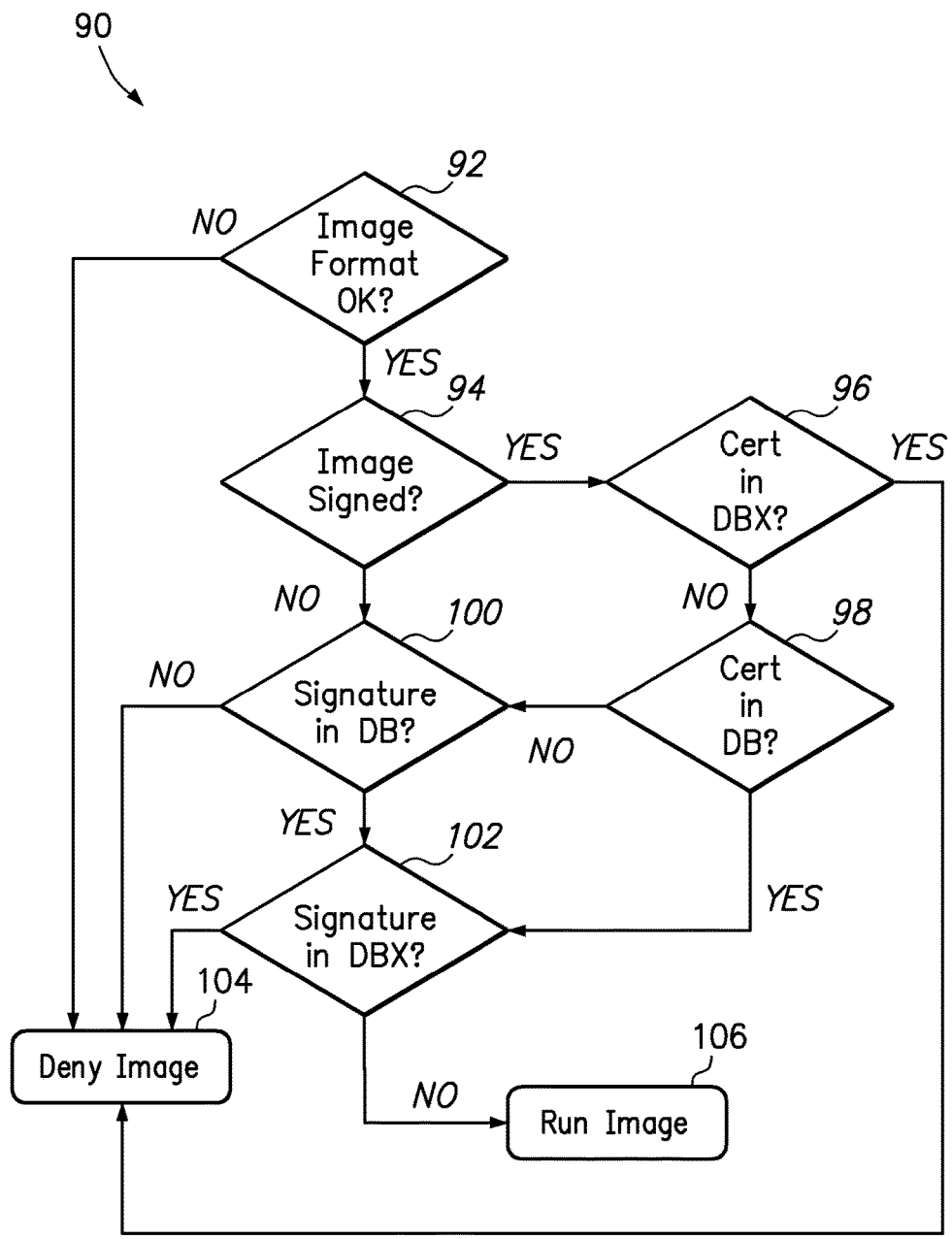
FIG. 3 is a flowchart of a method of determining whether or not an image is authorized to be run.

FIG. 3 is a flowchart of a method 90 of determining whether or not an image is authorized to be loaded and run. According to the method, if the image format is not OK (per step 92), then the image is denied from being loaded (per step 104). If the image format is OK (per step 92) and the image is signed (per step 94), the method determines (in step 96) whether the image has an associated certificate in the revocation database (DBX). If the image as an associated certificate in the revocation database (DBX) (per step 96), then the image is denied from being loaded (per step 104).

If the image does not have an associated certificate in the revocation database (DBX) (per step 96), then the method determines (per step 98) whether the image has an associated certificate in the authorization database (DB). If the image has an associated certificate in the authorization database (DB) (per step 98) but the image has an associated signature in the revocation database (DBX) (per step 102), then the image is denied from being loaded (per step 104). Conversely, if the image has an associated certificate in the authorization database (DB) (per step 98) but the image does not have an associated signature in the revocation database (DBX) (per step 102), then the image is allows to be loaded and run (per step 106).

If the image does not have an associated certificate in either the revocation database (DBX) (per step 96) or the authorization database (DB) (per step 98), then the method determines (per step 100) whether there is a signature associated with the image in the authorization database (BD). If there is no signature in the authorization database (BD) (per step 100), then the image is denied from being loaded (per step 104). However, if the image has an associated signature in the authorization database (DB) (per step 100) but the image also has an associated signature in the revocation database (DBX) (per step 102), then the image is denied from being loaded (per step 104). Conversely, if the image has an associated signature in the authorization database (DB) (per step 100) but the image does not have an associated signature in the revocation database (DBX) (per step 102), then the image may be loaded and run (per step 106).

Figure 4:
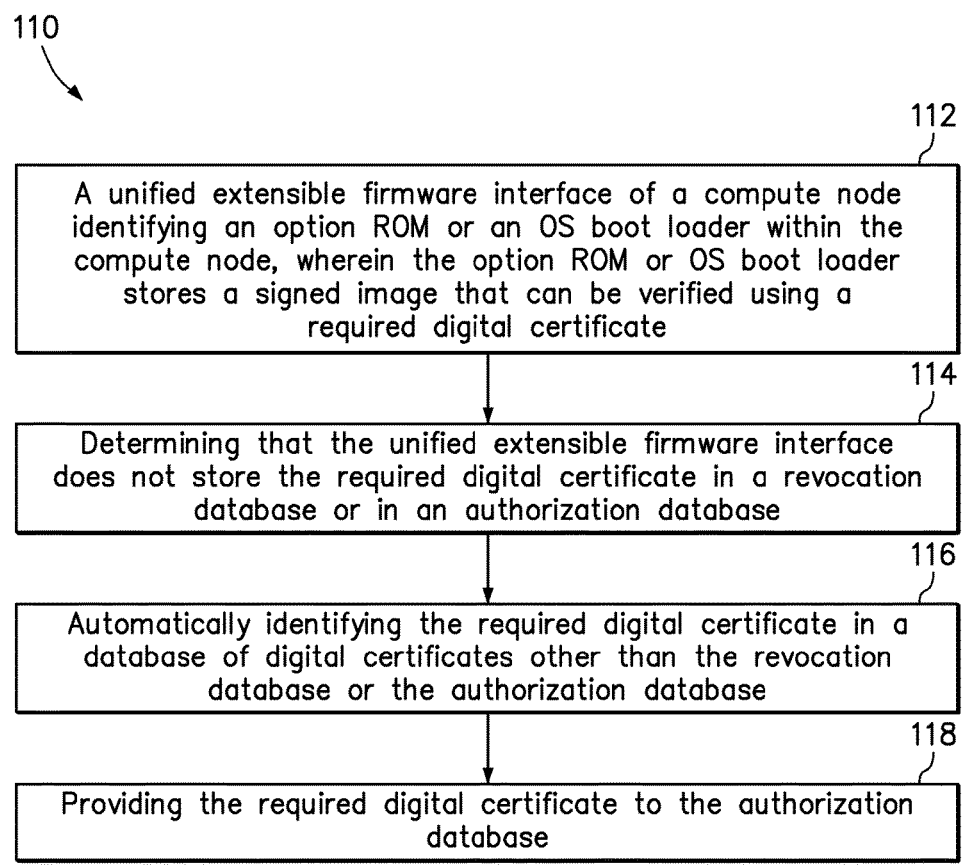
FIG. 4 is a flowchart of a method of automatically providing a required digital certificate to an authorization database so that an image may be loaded.

FIG. 4 is a flowchart of a method 110 of automatically providing a required digital certificate to an authorization database so that an image may be loaded. Step 112 includes a unified extensible firmware interface of a compute node identifying an option ROM or an OS boot loader within the compute node, wherein the option ROM or OS boot loader stores a signed image that can be verified using a required digital certificate. Step 114 includes determining that the unified extensible firmware interface does not store the required digital certificate in a revocation database or in an authorization database. Step 116 includes automatically identifying the required digital certificate in a database of digital certificates other than the revocation database or the authorization database. Then, step 118 includes providing the required digital certificate to the authorization database (DB).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
a unified extensible firmware interface of a compute node identifying an option ROM or an OS boot loader within the compute node, wherein the option ROM or OS boot loader stores a signed image that can be verified using a required digital certificate;
determining that the unified extensible firmware interface does not store the required digital certificate in a revocation database or in an authorization database;
automatically identifying the required digital certificate in a database of digital certificates other than the revocation database or the authorization database; and providing the required digital certificate to the authorization database.

2. The method of claim 1, wherein determining that the unified extensible firmware interface does not store the required digital certificate in a revocation database or in an authorization database, includes sequentially testing each digital certificate in the revocation database and the authorization database until all of the digital certificates in the revocation database and the authorization database have been tested without identifying the required digital certificate, wherein testing each digital certificate includes decoding a digital signature in the signed image with a public key included in the digital certificate, preparing a hash of the image, and comparing the decoded digital signature to the hash of the image, wherein a digital certificate is identified as the required digital certificate in response to determining that the decoded digital signature matches the hash of the image.

3. The method of claim 1, wherein automatically identifying the required digital certificate in a database of digital certificates other than the revocation database or the authorization database, includes sequentially testing each digital certificate in the database of digital certificates until identifying the required digital certificate, wherein testing each digital certificate includes decoding a digital signature in the signed image with a public key included in the digital certificate, preparing a hash of the image, and comparing the decoded digital signature to the hash of the image, wherein a digital certificate is identified as the required digital certificate in response to determining that the decoded digital signature matches the hash of the image.

4. The method of claim 1, wherein automatically identifying the required digital certificate in a database of digital certificates other than the revocation database or the authorization database, includes reading header information in the signed image to obtain an identifier for the required digital certificate and then searching the database of digital certificates for a digital certificate having the identifier.

5. The method of claim 1, further comprising:
verifying the signed image stored on the option ROM or OS boot loader using the required digital certificate; and
loading the signed image only if the signed image has been verified.

6. The method of claim 5, wherein verifying the signed image stored on the option ROM or OS boot loader using the digital certificate, includes decoding a digital signature of the signed image using a public key included in the required digital certificate and determining that the decoded digital signature matches a hash of the signed image.

7. The method of claim 1, wherein the database of digital certificates is stored in the unified extensible firmware interface of the compute node.

8. The method of claim 1, wherein the database of digital certificates is stored in an integrated management module.

9. The method of claim 1, wherein the database of digital certificates is stored in a chassis management module.

10. The method of claim 1, wherein the database of digital certificates is stored in a server other than the compute node.

11. The method of claim 1, further comprising:
automatically removing a selected digital certificate from the authorization database of the compute node in response to determining that the selected digital certificate is not used to verify an option ROM or OS boot loader in the computer node.

12. The method of claim 1, further comprising:
identifying a plurality of selected digital certificates in the authorization database of the compute node that are not being used to verify an option ROM or OS boot loader in the computer node; and
automatically removing at least one of the identified plurality of selected digital certificates from the authorization database on a first-in-first-out basis to provide enough data storage space in the authorization database for the required digital certificate.

13. A computer program product comprising a non-transitory computer readable storage medium having program instructions embodied therewith, the program instructions executable by a processor to cause the processor to perform a method comprising:
a unified extensible firmware interface of a compute node identifying an option ROM or an OS boot loader within the compute node, wherein the option ROM or OS boot loader stores a signed image that can be verified using a required digital certificate;
determining that the unified extensible firmware interface does not store the required digital certificate in a revocation database or in an authorization database;
automatically identifying the required digital certificate in a database of digital certificates other than the revocation database or the authorization database; and
providing the required digital certificate to the authorization database.

14. The computer program product of claim 13, wherein determining that the unified extensible firmware interface does not store the required digital certificate in a revocation database or in an authorization database, includes sequentially testing each digital certificate in the revocation database and the authorization database until all of the digital certificates in the revocation database and the authorization database have been tested without identifying the required digital certificate, wherein testing each digital certificate includes decoding a digital signature in the signed image with a public key included in the digital certificate, preparing a hash of the image, and comparing the decoded digital signature to the hash of the image, wherein a digital certificate is identified as the required digital certificate in response to determining that the decoded digital signature matches the hash of the image.

15. The computer program product of claim 13, wherein automatically identifying the required digital certificate in a database of digital certificates other than the revocation database or the authorization database, includes sequentially testing each digital certificate in the database of digital certificates until identifying the required digital certificate, wherein testing each digital certificate includes decoding a digital signature in the signed image with a public key included in the digital certificate, preparing a hash of the image, and comparing the decoded digital signature to the hash of the image, wherein a digital certificate is identified as the required digital certificate in response to determining that the decoded digital signature matches the hash of the image.

16. The computer program product of claim 13, wherein automatically identifying the required digital certificate in a database of digital certificates other than the revocation database or the authorization database, includes reading header information in the signed image to obtain an identifier for the required digital certificate and then searching the database of digital certificates for a digital certificate having the identifier.

17. The computer program product of claim 13, the method further comprising:
  verifying the signed image stored on the option ROM or OS boot loader using the required digital certificate; and
  loading the signed image only if the signed image has been verified.

18. The computer program product of claim 17, wherein verifying the signed image stored on the option ROM or OS boot loader using the digital certificate, includes decoding a digital signature of the signed image using a public key included in the required digital certificate and determining that the decoded digital signature matches a hash of the signed image.

19. The computer program product of claim 13, wherein the database of digital certificates is stored in the unified extensible firmware interface or an integrated management module of the compute node.

20. The computer program product of claim 13, wherein the database of digital certificates is stored in a chassis management module or a server other than the compute node.

\* \* \* \* \*